(12) United States Patent
Ichikawa et al.

(10) Patent No.: US 12,044,593 B2
(45) Date of Patent: Jul. 23, 2024

(54) DIAGNOSIS APPARATUS

(71) Applicant: SUMITOMO HEAVY INDUSTRIES, LTD., Tokyo (JP)

(72) Inventors: Tomoko Ichikawa, Kanagawa (JP); Yutaka Akedo, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 248 days.

(21) Appl. No.: 17/844,525

(22) Filed: Jun. 20, 2022

(65) Prior Publication Data

US 2022/0316983 A1 Oct. 6, 2022

Related U.S. Application Data

(63) Continuation of application No. PCT/JP2020/043127, filed on Nov. 19, 2020.

(30) Foreign Application Priority Data

Dec. 20, 2019 (JP) ................................ 2019-229883

(51) Int. Cl.
*G01M 13/021* (2019.01)
*G01H 1/12* (2006.01)
(Continued)

(52) U.S. Cl.
CPC .......... *G01M 13/021* (2013.01); *G01H 17/00* (2013.01); *G05B 23/02* (2013.01)

(58) Field of Classification Search
CPC .... G01M 99/005; G01M 15/00; G01M 13/02; G01M 13/045; G01M 15/046;
(Continued)

(56) References Cited

U.S. PATENT DOCUMENTS

2008/0234964 A1\* 9/2008 Miyasaka ............. G01M 13/04
702/113
2010/0141394 A1 6/2010 Sugiyama
(Continued)

FOREIGN PATENT DOCUMENTS

| JP | 2010-134675 A | 6/2010 |
| JP | 2017-181500 A | 10/2017 |
| JP | 2019-040439 A | 3/2019 |

OTHER PUBLICATIONS

International Search Report issued in Application No. PCT/JP2020/043127, mailed Feb. 2, 2021.

*Primary Examiner* — Brandi N Hopkins
(74) *Attorney, Agent, or Firm* — Michael Best & Friedrich LLP

(57) ABSTRACT

A diagnosis apparatus includes: a sensor that detects diagnosis target information generated by a diagnosis target device; a threshold setting unit that sets a threshold for the diagnosis target information; and a diagnosis unit that diagnoses the diagnosis target device based on the diagnosis target information detected by the sensor and the threshold, in which the threshold setting unit sets the threshold based on the diagnosis target information in a predetermined period before a diagnosis time point, and the diagnosis unit performs diagnosis based on a current time point threshold set at the diagnosis time point and at least one past threshold set in the past.

9 Claims, 5 Drawing Sheets

(51) Int. Cl.
  *G01H 17/00* (2006.01)
  *G01M 13/028* (2019.01)
  *G05B 23/02* (2006.01)

(58) Field of Classification Search
  CPC ....... G01M 7/025; G01H 1/006; G01H 17/00; G01H 3/00; G01H 11/06; G05B 13/0265; G05B 19/0428; G05B 19/042; G05B 23/0243; G01B 21/22; G01D 21/02; G01R 31/34
  See application file for complete search history.

(56) References Cited

U.S. PATENT DOCUMENTS

| | | | |
|---|---|---|---|
| 2014/0142871 A1* | 5/2014 | Lombriser | G01H 1/00 |
| | | | 702/56 |
| 2017/0284201 A1* | 10/2017 | Suzuki | G01M 13/021 |
| 2019/0101103 A1 | 4/2019 | Haseba et al. | |
| 2019/0137360 A1* | 5/2019 | Miyasaka | G01H 1/003 |

\* cited by examiner

DIAGNOSIS APPARATUS

RELATED APPLICATIONS

The contents of Japanese Patent Application No. 2019-229883, and of International Patent Application No. PCT/JP2020/043127, on the basis of each of which priority benefits are claimed in an accompanying application data sheet, are in their entirety incorporated herein by reference.

BACKGROUND

Technical Field

Certain embodiments of the present invention relate to a diagnosis apparatus.

Description of Related Art

In the related art, a system which diagnoses an abnormality by detecting diagnosis target information (for example, vibration) generated in an apparatus, a device, or the like has been proposed.

In such a diagnosis system in the related art, an apparatus, a device, or the like is a diagnosis target, diagnosis target information is continuously detected by a sensor, the moving average of the detected data is calculated, the standard deviation is obtained from the value, and a threshold for determining an abnormality is calculated from the values of the moving average and the standard deviation and is continuously recorded.

In addition, an abnormality is diagnosed by comparing the current detected data to the threshold calculated at a time close to the past operating conditions.

SUMMARY

According to an embodiment of the present invention, there is provided a diagnosis apparatus including:

a sensor that detects diagnosis target information generated by a diagnosis target device;

a threshold setting unit that sets a threshold for the diagnosis target information; and a diagnosis unit that diagnoses the diagnosis target device based on the diagnosis target information detected by the sensor and the threshold, in which the threshold setting unit sets the threshold based on the diagnosis target information in a predetermined period before a diagnosis time point, and the diagnosis unit performs diagnosis based on a current time point threshold set at the diagnosis time point and at least one past threshold set in the past.

DETAILED DESCRIPTION

In the related art described above, there may be a case where the tendency of the diagnosis target information such as vibration fluctuates even under the same operating conditions, and it is difficult to set an appropriate threshold in such a case.

It is desirable to provide a diagnosis apparatus that enables a more appropriate diagnosis.

Hereinafter, embodiments of the present invention will be described in detail with reference to the drawings.

This embodiment exemplifies a diagnosis apparatus which uses a reduction gear as a diagnosis target device, and vibration as diagnosis target information.

Figure 1:
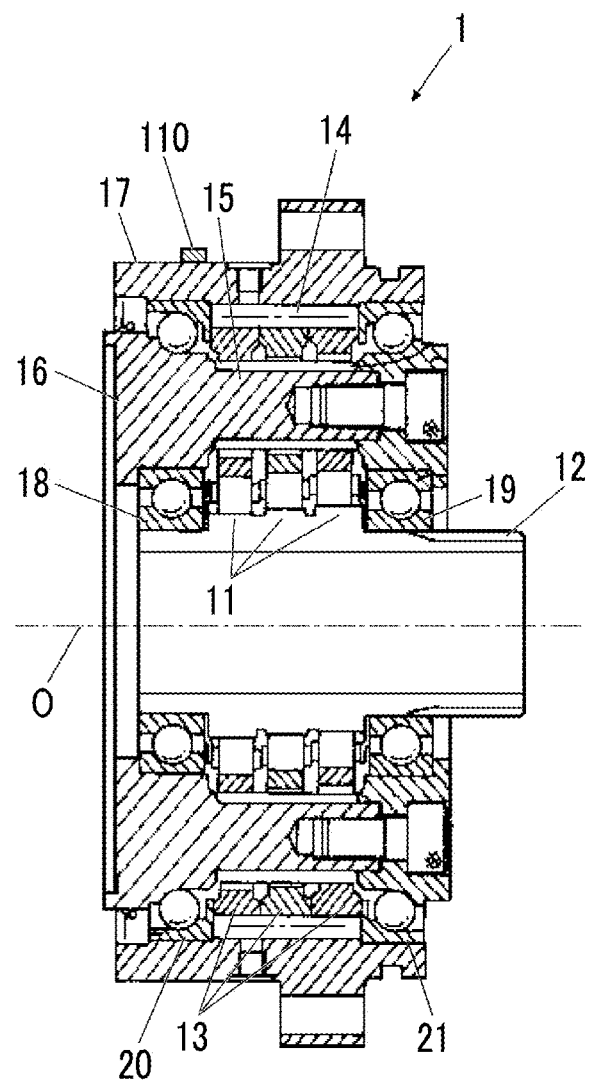
FIG. 1 is a cross-sectional view showing a reduction gear which is a position example of a diagnosis target device.

FIG. 1 is an axial sectional view of an eccentric oscillating reduction gear 1 which is a diagnosis target device. As illustrated in this figure, the reduction gear 1 includes an input shaft 12 having three eccentric bodies 11, three external gears 13, an internal gear 14 that meshes with the three external gears 13, a flange body 16 having an inner pin 15, a casing 17 that holds the internal gear 14, and bearings 18 to 21. In the following description, the "radial direction" is the radial direction of the circumference centered on the center line O of the input shaft 12.

Since this reduction gear 1 has the same configuration as the power transmission device disclosed in Japanese Unexamined Patent Publication No. 2006-263878, detailed description of each configuration will be omitted.

Figure 2:
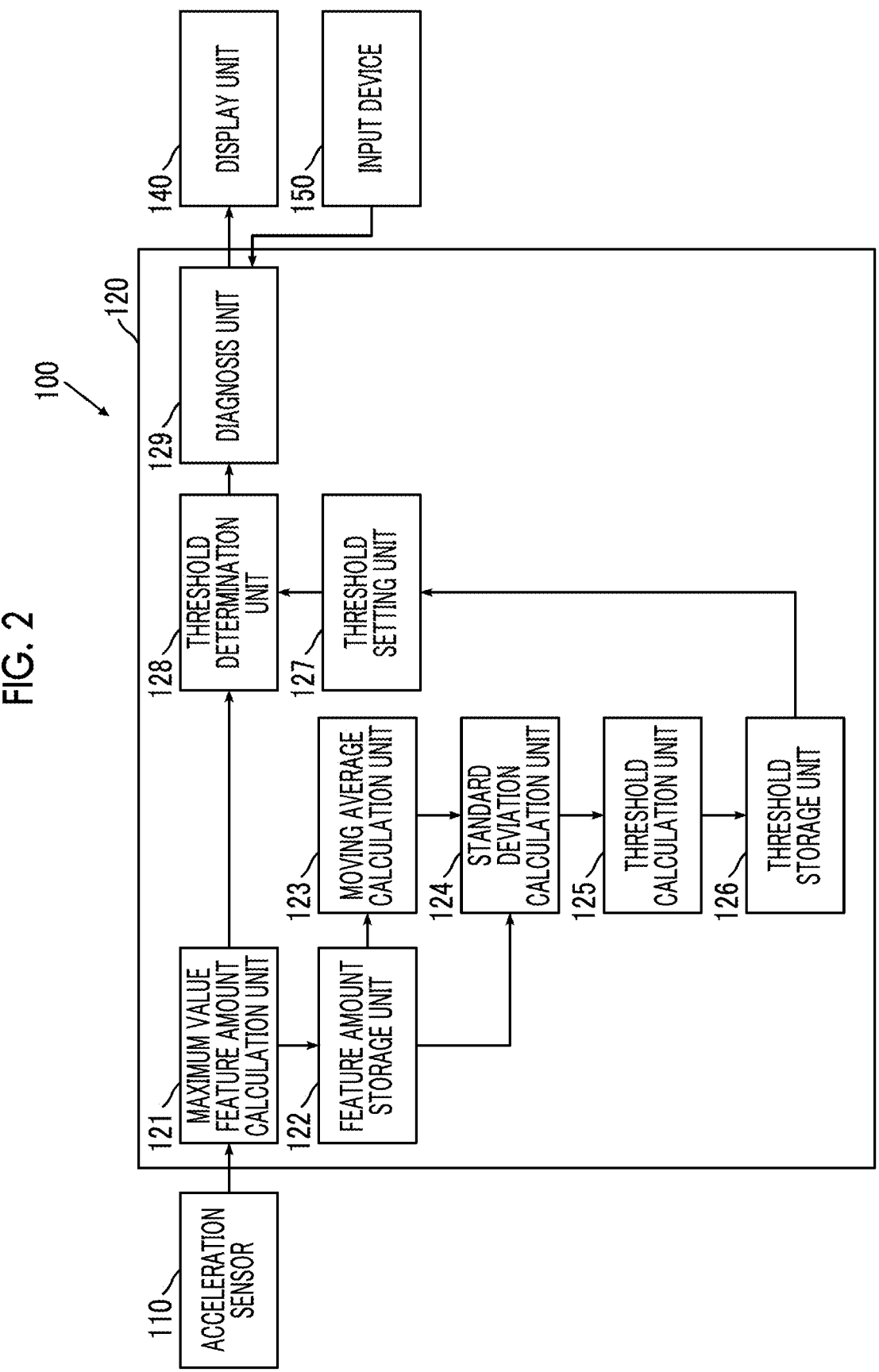
FIG. 2 is a functional block diagram showing a diagnosis apparatus according to an embodiment.

FIG. 2 is a functional block diagram showing a diagnosis apparatus 100 according to an embodiment.

The diagnosis apparatus 100 includes an acceleration sensor 110 as a sensor provided in the reduction gear 1, a calculator 120 that receives an output of vibration as diagnosis target information detected by the acceleration sensor 110 and performs diagnostic processing of the reduction gear 1, a display unit 140 that displays and outputs information, and an input device 150 such as a pointing device or a keyboard that can input data to the calculator 120 from the outside.

The acceleration sensor 110 is provided at a position on the outer periphery of the casing 17 of the reduction gear 1 outside the internal gear 14 in the radial direction. The disposition of the sensor is not limited to the above and can be changed as appropriate.

The acceleration sensor 110 detects the vibration of the reduction gear 1 and outputs vibration waveform data in response to the detection to the calculator 120. As the acceleration sensor 110, for example, a contact type acceleration sensor using a piezoelectric element is used.

The calculator 120 includes a central processing unit (CPU), a storage device that stores control data and programs, a random access memory (RAM), an interface that receives the vibration waveform data from the acceleration sensor 110, and the like, and is also connected to the display unit 140 and the input device 150.

The calculator 120 diagnoses an abnormality of the reduction gear 1 by using the vibration waveform data of the reduction gear 1 according to a preset program.

As shown in FIG. 2, the calculator 120 includes a maximum value feature amount calculation unit 121 as a feature amount calculation unit, a feature amount storage unit 122, a moving average calculation unit 123, a standard deviation calculation unit 124, and a threshold calculation unit 125, a threshold storage unit 126, a threshold setting unit 127, a threshold determination unit 128, and a diagnosis unit 129.

These are functional configurations realized by the CPU of the calculator 120 executing a program.

Figure 3:
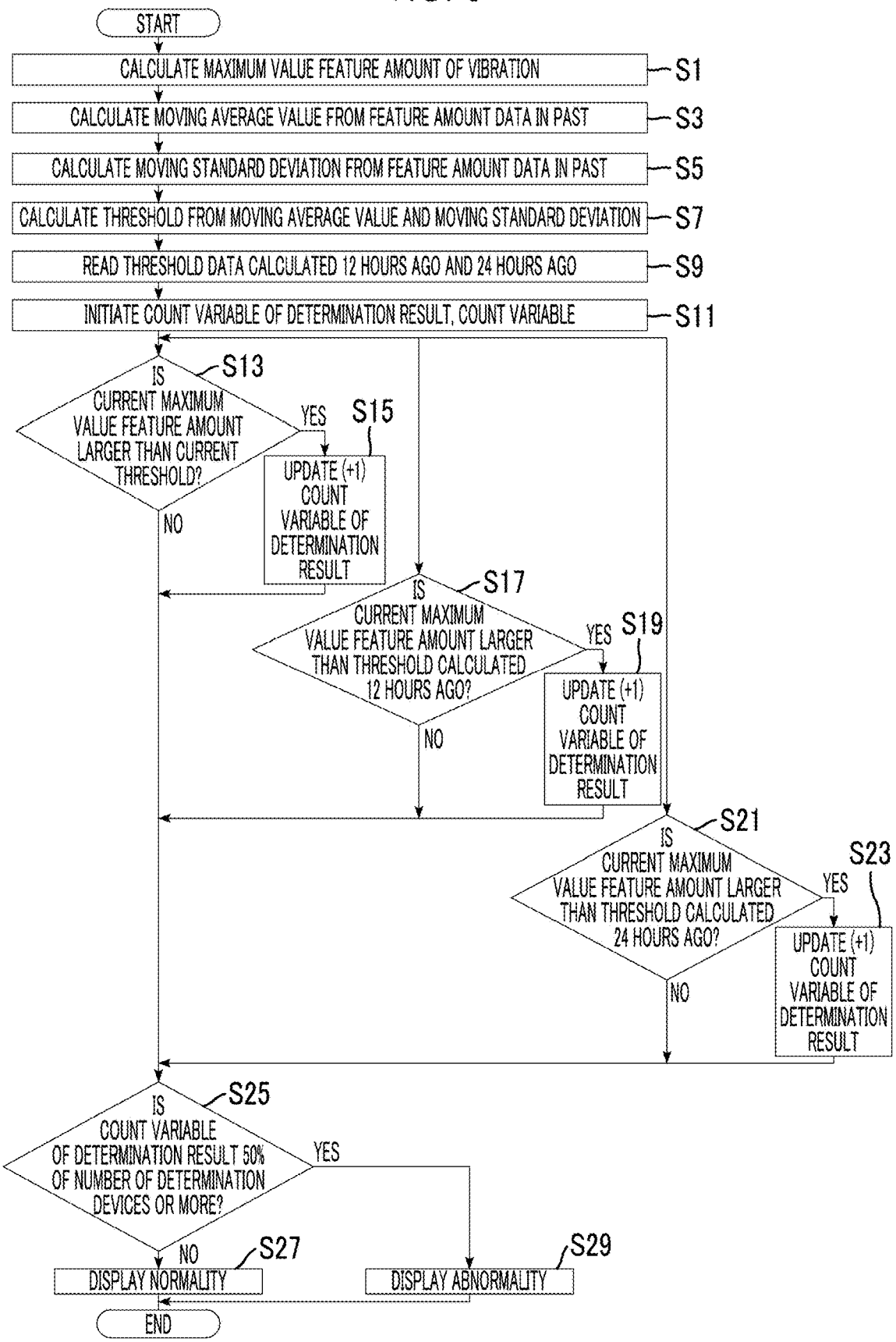
FIG. 3 is a flowchart showing a diagnostic process executed by a calculator of the diagnosis apparatus.

Hereinafter, the processing contents executed by the various functional configurations of the calculator 120 will be described with reference to the flowchart of FIG. 3. The specific numerical values and quantities shown below are examples and can be changed.

First, the acceleration sensor 110 periodically detects vibration and generates vibration waveform data while the reduction gear 1 is operated. For example, a change in vibration for 10 seconds is detected once every 20 minutes, and vibration waveform data is generated. The detection of vibration may be performed continuously instead of periodically, and the continuous vibration waveform data may be separated by a predetermined unit time.

When the vibration waveform data is input from the acceleration sensor 110, the maximum value feature amount calculation unit 121 calculates the current maximum value feature amount from the vibration waveform (step S1).

As described above, when the vibration waveform data indicating the change in vibration from 10 seconds ago to the present is acquired from the acceleration sensor 110, the maximum value feature amount calculation unit 121 divides the vibration waveform, for example, for 10 seconds, into a plurality of sections, or extracts a plurality of sections that satisfy predetermined conditions such as the magnitude of the rate of change, obtains the maximum value of vibration for each section as the feature amount, and averages the feature amounts, thereby calculating the maximum value feature amount at the current time point.

The maximum value feature amount calculation unit 121 may calculate the maximum value feature amount after performing envelope processing on the vibration waveform data input from the acceleration sensor 110 in advance.

The feature amount storage unit 122 performs a process of storing the value of the maximum value feature amount calculated by the maximum value feature amount calculation unit 121 in the storage device of the calculator 120 every 20 minutes.

The moving average calculation unit 123 calculates the average value (moving average) of a plurality of maximum value feature amounts from 6 hours ago to the present (a predetermined period before the diagnosis time point), which are stored in the storage device and acquired every 20 minutes by the maximum value feature amount calculation unit 121 (step S3).

That is, the moving average calculation unit 123 calculates the moving average every 20 minutes according to the detection cycle of the acceleration sensor 110.

Next, the standard deviation calculation unit 124 calculates a standard deviation using the plurality of maximum value feature amounts from 6 hours ago to the present, which are stored in the storage device and acquired every 20 minutes by the maximum value feature amount calculation unit 121, and the average value calculated by the moving average calculation unit 123 (step S5).

That is, the standard deviation calculation unit 124 calculates the standard deviation every 20 minutes according to the detection cycle of the acceleration sensor 110.

Next, the threshold calculation unit 125 calculates a threshold (referred to as T) using the average value (referred to as Xave) calculated by the moving average calculation unit 123 and the standard deviation (referred to as σ) of the standard deviation calculation unit 124 (step S7). This threshold is a threshold for comparison with the maximum value feature amount in order to diagnose the abnormality of the reduction gear 1.

That is, the threshold calculation unit 125 calculates the threshold every 20 minutes according to the detection cycle of the acceleration sensor 110.

For example, the threshold calculation unit 125 calculates the threshold T by T=Xave+3σ. The calculation formula is an example, and the threshold T may be calculated by changing the coefficient of σ or by another formula having Xave and σ as parameters.

The threshold storage unit 126 performs a process of storing the threshold calculated by the threshold calculation unit 125 in the storage device of the calculator 120 every 20 minutes.

The threshold setting unit 127 performs a process of reading a current time point threshold, which is the latest threshold calculated by the threshold calculation unit 125 at the current time point, a first past threshold (past threshold) calculated 12 hours ago, and a second past threshold (past threshold) calculated 24 hours ago, from the storage device of the calculator 120 (step S9).

The threshold determination unit 128 compares the maximum value feature amount at the current time point calculated by the maximum value feature amount calculation unit 121 to each of the current time point threshold, the first past threshold, and the second past threshold set by the threshold setting unit 127, and determines whether or not each of the thresholds is exceeded.

During the determination, the threshold determination unit 128 performs a process of resetting a count variable for counting how many of the above three thresholds the maximum value feature amount at the current time point exceeds to 0 in advance (step S11).

Furthermore, the threshold determination unit 128 individually compares the maximum value feature amount at the current time point to the current time point threshold, the first past threshold, and the second past threshold.

That is, it is determined whether or not the current maximum value feature amount at the current time point is larger than the current time point threshold (step S13). In a case where the current time point threshold is not exceeded, the process proceeds to step S25 as it is. In a case where the current time point threshold is exceeded, one is added to the count variable (step S15), and then the process proceeds to step S25.

Similarly, it is determined whether or not the maximum value feature amount at the current time point is larger than the first past threshold (step S17). In a case where the first past threshold is not exceeded, the process proceeds to step S25 as it is. In a case where the first past threshold is exceeded, one is added to the count variable (step S19), and then the process proceeds to step S25.

Similarly, it is determined whether or not the maximum value feature amount at the current time point is larger than the second past threshold (step S21). In a case where the second past threshold is not exceeded, the process proceeds to step S25 as it is. In a case where the second past threshold is exceeded, one is added to the count variable (step S23), and then the process proceeds to step S25.

The magnitude determination between the maximum value feature amount at the current time point and the current time point threshold in step S13, the magnitude determination between the maximum value feature amount at the current time point and the first past threshold in step S17, and the magnitude determination between the maximum value feature amount at the current time point and the second past threshold in step S21 may not be performed in parallel, but may be performed in order.

The diagnosis unit 129 diagnoses whether or not an abnormality has occurred in the reduction gear 1 based on the determination results of steps S13 to S23 by the threshold determination unit 128 (step S25).

Specifically, the diagnosis unit 129 determines whether or not an abnormality is present depending on whether or not the above-mentioned count variable is 50% or more of the maximum total value of the count numbers of all determination devices. The determination devices consist of three determination devices including a determination device in step S13 in which the maximum value feature amount at the current time point and the current time point threshold are compared to each other, a determination device in step S17 in which the maximum value feature amount at the current time point and the first past threshold are compared to each other, and a determination device in step S21 in which the maximum value feature amount at the current time point and the second past threshold are compared to each other, and the maximum total value of the count numbers is 3. Therefore, in a case where the count variable is larger than 1.5, the occurrence of an abnormality is diagnosed.

While the case where the occurrence of an abnormality of the reduction gear 1 is diagnosed in a case where the ratio of abnormalities in the determination results of the current time point threshold and the first and second past thresholds is 50% or more is exemplified, the ratio is an example and can be increased or decreased in consideration of the number of determination devices.

Alternatively, the diagnosis unit 129 may determine weighting coefficients in advance for some or all of the count numbers of the determination device of the current time point threshold, the determination device of the first past threshold, and the determination device of the second past threshold, multiply the weighting coefficients, and then perform diagnosis of an abnormality from the ratio to the maximum total value.

It is preferable to store the weighting coefficients in the storage device in advance. Furthermore, the weighting coefficients may be optionally set through the input device 150.

In a case where the count variable is 1 or less and it is diagnosed that there is no abnormality, the diagnosis unit 129 controls the display unit 140 to display the normal state of the reduction gear 1 (step S27), and ends a series of processes.

In a case where the count variable is 2 or more and it is diagnosed that there is an abnormality, the display unit 140 is controlled to display the occurrence of an abnormality in the reduction gear 1 (step S29), and a series of processes is ended.

Figure 4:
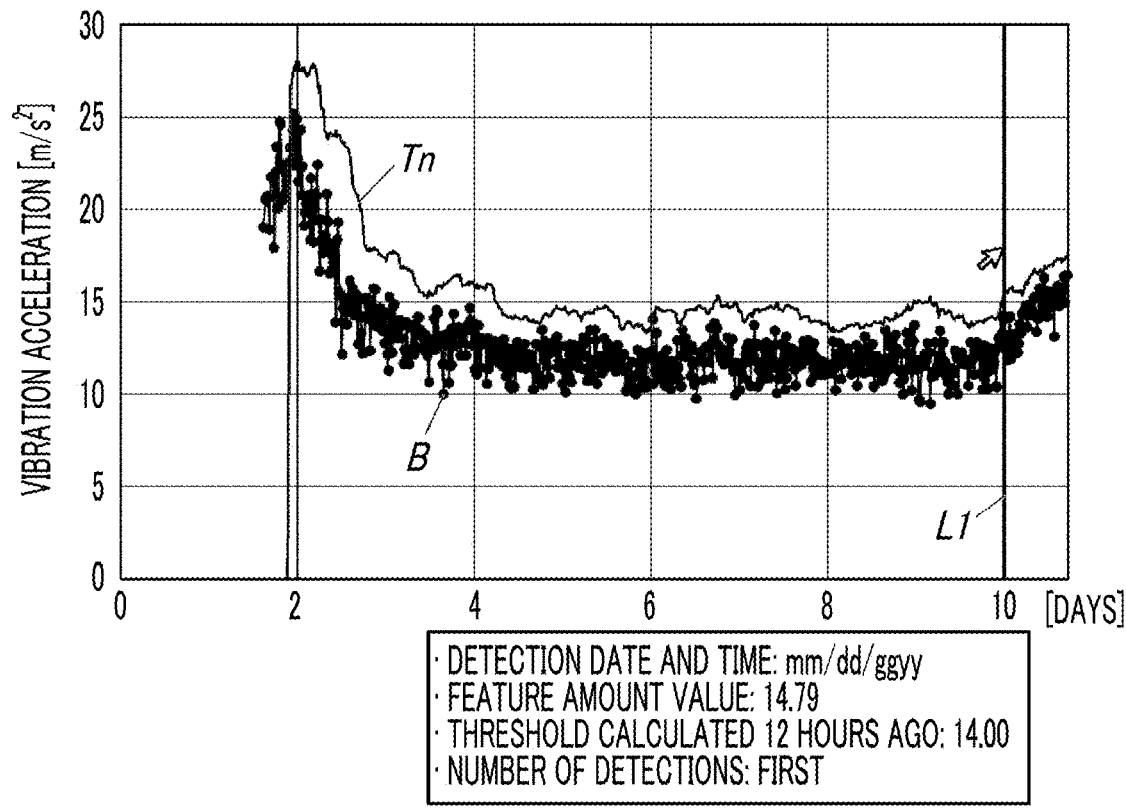
FIG. 4 is a graph showing a diagram showing a transition of numerical values of maximum value feature amounts and a diagram showing a transition of numerical values of current time point thresholds, the diagrams being superimposed.

The diagnosis unit 129 controls the display unit 140 at the time of each diagnosis to display a diagram B showing the transition of the numerical values of maximum value feature amounts acquired every 20 minutes and a diagram Tn showing the transition of the numerical values of current time point thresholds acquired every 20 minutes to be superimposed on one graph (see FIG. 4).

Similarly, the diagnosis unit 129 controls the display unit 140 to display the diagram B showing the transition of the numerical values of maximum value feature amounts acquired every 20 minutes and a diagram showing the transition of the numerical values of first past thresholds acquired every 20 minutes to be superimposed on one graph (not shown).

Figure 5:
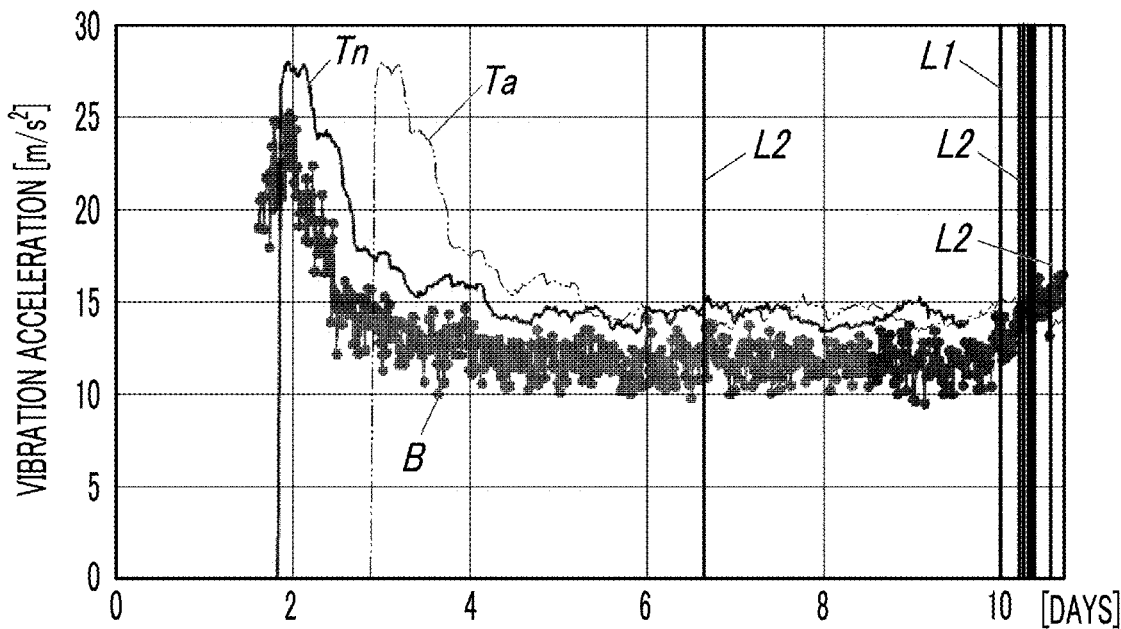
FIG. 5 is a graph showing the diagram showing the transition of numerical values of maximum value feature amounts and a diagram showing a transition of numerical values of second past thresholds, the diagrams being superimposed.

Furthermore, the diagnosis unit 129 controls the display unit 140 to display the diagram B showing the transition of the numerical values of maximum value feature amounts acquired every 20 minutes and a diagram Ta showing the transition of the numerical values of second past thresholds acquired every 20 minutes to be superimposed on one graph (see FIG. 5).

Then, the diagnosis unit 129 performs to control to display the time point when the maximum value feature amount exceeds each threshold and the time point when it is diagnosed that there is an abnormality on the above three graphs displayed on the display unit 140.

FIG. 5 shows an example of displaying the time point (comparison result) when the maximum value feature amount exceeds the threshold as line L2, and FIGS. 4 and 5 show an example of displaying the time point when it is diagnosed that there is an abnormality, as line L1.

The time point when it is diagnosed that there is an abnormality coincides with the time point when the maximum value feature amount exceeds the threshold, but the line L1 indicating that the diagnosis of an abnormality is preferentially displayed.

As shown in FIG. 4, in a case where the line L1 is selected by a click operation or the like, various kinds of information related to the diagnosis may be displayed in a pop-up display or the like or outside the frame of the graph. In FIG. 4, as the information, the detection date and time, the feature amount value, the past threshold calculated 12 hours ago, the number of detections, and the like are displayed. However, the information is not limited thereto, and any related information can be displayed.

The number of detections shown here is a numerical value in a case where the number of times an abnormality is diagnosed within a predetermined period is counted and recorded. As described above, the diagnosis unit 129 may record the number of times an abnormality is diagnosed.

Display of the various kinds of information related to the above diagnosis is not limited to the line L1 and may be performed in the same manner for the line L2.

Furthermore, as shown in FIG. 5, the diagram Tn showing the transition of the numerical values of current time point thresholds and the diagram Ta showing the transition of the numerical values of second past thresholds may be displayed to be superimposed on one screen (the same applies to the diagram showing the transition of the numerical values of first past thresholds).

Technical Effects of Embodiment of Invention

As described above, in the diagnosis apparatus 100, the threshold setting unit 127 sets the threshold based on the vibration (maximum value feature amount) in the predetermined period before the diagnosis time point, and the diagnosis unit 129 performs diagnosis based on the current time point threshold set at the diagnosis time point and one or more past thresholds (the first past threshold and the second past threshold) set in the past.

Therefore, since diagnosis is performed with the current time point threshold, even in a case where there is a change in the tendency of vibration, which is the diagnosis target information, the change is reflected in the current time point threshold. Accordingly, it is possible to set an appropriate threshold and perform diagnosis.

On the other hand, in a case where diagnosis is performed only with the current time point threshold, there is concern that a threshold affected by an external factor at the time of diagnosis may be set, and there may be cases where an abnormality is determined by an external factor and an internal factor. However, since the diagnosis unit 129 of the diagnosis apparatus 100 also performs determination based on the past threshold, the influence of an external factor can be reduced, and the occurrence of an abnormality which is an internal factor of the apparatus can be detected by the determination.

Similarly, in the detection of vibration, even in a case where a fluctuation that causes noise occurs, there is no influence on the past thresholds at different time points. Therefore, the influence of noise on the diagnosis is reduced, and it is possible to perform a more appropriate diagnosis.

As a result, the diagnosis apparatus 100 can more appropriately diagnose an abnormality of the device while responding to the fluctuation of the tendency of vibration, which is the diagnosis target information.

In addition, the diagnosis unit 129 diagnoses that there is an abnormality in a case where the ratio of abnormalities in the diagnosis result of each of the current time point threshold and the first and second past thresholds is a predetermined value (50% in the above example) or more.

By setting the ratio and determining an abnormality as described above, even in a case where it is determined that there is no abnormality based on some of the thresholds, an abnormality can be determined based on the other thresholds. Therefore, it is possible to perform a more appropriate diagnosis without omission.

Here, in a case where the diagnosis unit 129 is configured to weight all or some of the current time point threshold and the first and second past thresholds and then perform diagnosis of an abnormality from the ratio of the abnormalities, it is possible to perform a more appropriate diagnosis according to the tendency of the diagnosis target.

In addition, since the diagnosis apparatus 100 has the display unit 140 that displays the transition of the maximum value feature amount of vibration in a predetermined period, the current time point threshold set in the predetermined period, and each of the first and second past thresholds, it is possible to visually recognize the correlation between the maximum value feature amount of vibration that changes with time and each of the thresholds, and it is possible not only to diagnose an abnormality but also to easily identify the operating state of the reduction gear 1.

Furthermore, since the time point when it is diagnosed that there is an abnormality is marked by the line L1 in the transition of the maximum value feature amount of the vibration in a predetermined period displayed on the display unit 140, not only the occurrence of the current abnormality but also the history of the occurrence of past abnormalities can be visually checked. Therefore, changes in the maximum value feature amount of vibration before and after the occurrence of an abnormality and changes in each of the thresholds can be checked simultaneously. Therefore, this is also useful for analysis related to the diagnosis of an abnormality.

In addition, since the display unit 140 displays the comparison result for each of the current time point threshold and the first and second past thresholds used for diagnosis with the line L2, it is possible to visually and quickly recognize the magnitude of each of the thresholds when the maximum value feature amount of vibration exceeds each of the thresholds.

In addition, by displaying the information related to the diagnosis at the time points of the lines L1 and L2 on the display unit 140, it is possible to visually and quickly recognize more detailed information at a specific time point.

Others

While the embodiment of the present invention has been described above, the present invention is not limited to the embodiment. That is, the details shown in the embodiment can be appropriately changed without departing from the concept of the invention.

For example, in the embodiment, the diagnosis target device is a reduction gear, but is not limited thereto. For example, the embodiment can be applied to any machines, instruments, and devices that require diagnosis, such as a gear motor, an injection molding machine, and a cryocooler.

In addition, the diagnosis target information is not limited to vibration, and can be any information that can be detected by various sensors and used for diagnosis, such as current and temperature.

In addition, the content of the diagnosis is not limited to the presence or absence of an abnormality, and can be any events that have to be predicted in advance, such as life prediction.

There may be cases where the tendency of the diagnosis target information fluctuates due to the influence of the surrounding environment. For example, in a case where the temperature, or the like changes in a fixed time zone and thus the tendency of the diagnosis target information fluctuates in the fixed time zone, the diagnosis apparatus 100 may be provided with a timer or the like to change the cycle in which the sensor performs sensing in the fixed time zone (for example, shorten the period to increase the detection frequency).

In addition, as the past threshold, the threshold 12 hours ago and the threshold 24 hours ago are adopted, but these times are examples and can be appropriately changed according to the characteristics of the diagnosis target information. In addition, the number of past thresholds used for diagnosis can be optionally increased or decreased.

Furthermore, in the embodiment, a case where the maximum value feature amount calculation unit 121 as the feature amount calculation unit of the calculator 120 calculates the maximum value feature amount by dividing the vibration waveform data input from the acceleration sensor 110 into a plurality of sections and averaging the maximum values of vibration in any section as the feature amount is exemplified, but the feature amount calculation unit is not limited thereto.

The feature amount calculation unit may obtain the feature amount from the processing result obtained by performing predetermined numerical processing on the detected vibration waveform data, and more preferably performs conversion into a numerical value having a correlation with the original vibration waveform data or another numerical value that retains the tendency of a change in numerical value.

As an example, when the feature amount calculation unit acquires the vibration waveform data from the acceleration sensor 110, the feature amount calculation unit may divide the vibration waveform for 10 seconds into a plurality of sections or extract a plurality of sections that satisfy predetermined conditions such as the magnitude of the rate of change, obtain the minimum value or average value of vibration for each section as the feature amount, and further average the feature amounts, thereby calculating the feature amount at the current time point.

In addition, the feature amount calculation unit may individually calculate a plurality of kinds of feature amounts by a plurality of different operations. For example, the minimum, average, and maximum values of vibration for each section are obtained, and the values are averaged for each section, and as the feature amount at the current time point, the feature amount based on the minimum value, the feature amount based on the average value, and the feature amount based on the maximum value are calculated.

Then, the threshold calculation unit 125 calculates the threshold for each of the plurality of feature amounts, and the threshold determination unit 128 compares the plurality of feature amounts to each of the current time point threshold and one or more past thresholds and obtains the count number of the determination result. For example, in a case where three kinds of feature amounts are obtained and compared to each of the current time point threshold, the first past threshold, and the second past threshold, the maximum total value of the count numbers is 3×3=9.

Therefore, the diagnosis unit 129 may diagnose the occurrence of an abnormality in the reduction gear 1 in a case where the ratio of abnormalities in the determination result to the maximum total value 9 is a predetermined ratio (for example, 50%) or more.

In addition, in the embodiment, the configuration including the acceleration sensor 110, the calculator 120, the display unit 140, and the input device 150 is exemplified as the diagnosis apparatus 100, but the configuration can be changed as long as the configuration has the same function as the diagnosis apparatus.

Figure 6:
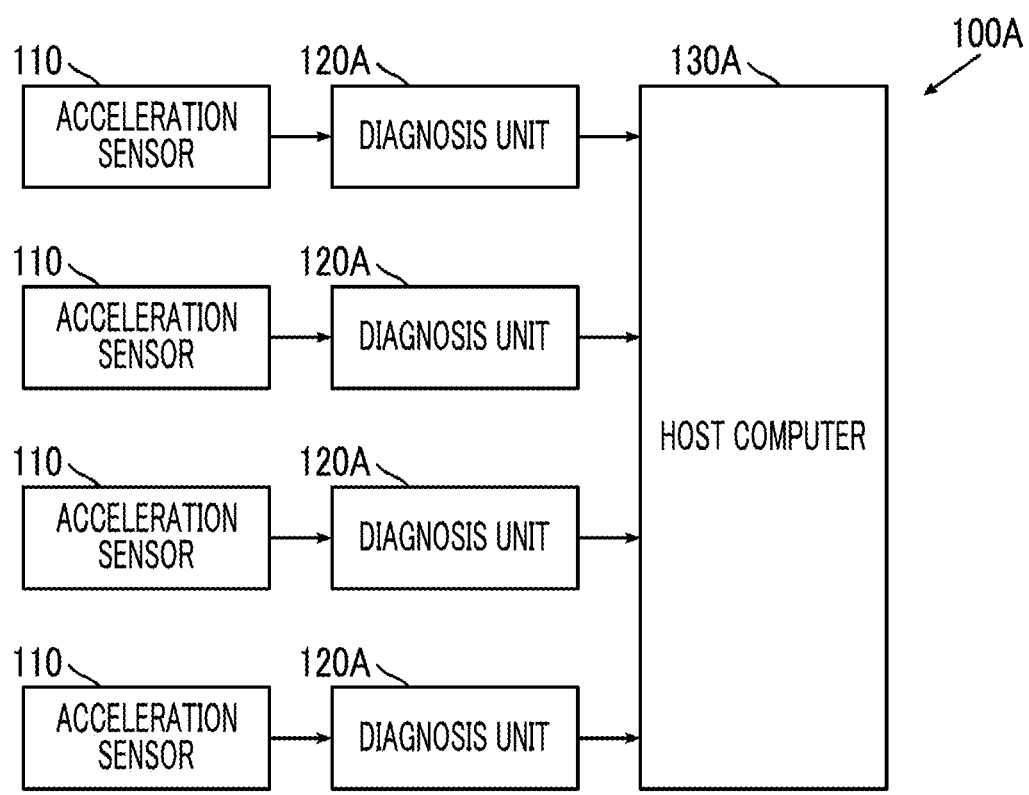
FIG. 6 is a block diagram showing another example of the diagnosis apparatus according to the embodiment.

For example, as shown in FIG. 6, a diagnosis apparatus may be configured by a plurality of sensors (exemplified by four acceleration sensors 110) individually provided in a plurality of diagnosis target devices or a plurality of sensors provided at a plurality of places of one or a plurality of diagnosis target devices, a plurality of diagnosis units 120A individually provided in the plurality of sensors, and a host computer 130A connected to all the diagnosis units 120A and having a display unit and an input device.

In the case of the diagnosis apparatus 100A, as a configuration in which the diagnosis unit 120A and the host computer 130A include a CPU, a RAM, an auxiliary storage device, and the like, various functions of the maximum value feature amount calculation unit 121, the feature amount storage unit 122, the moving average calculation unit 123, the standard deviation calculation unit 124, the threshold calculation unit 125, the threshold storage unit 126, the threshold setting unit 127, the threshold determination unit 128, and the diagnosis unit 129 may be shared by the diagnosis units 120A and the host computer 130A and executed.

Alternatively, each of the functional units 121 to 129 may be executed by each of the diagnosis units 120A, and the host computer 130A may be configured to perform a process of collecting and displaying the diagnosis results and transmit various settings to each of the diagnosis units 120A.

Alternatively, the configuration is not limited to the above, and each of the functional units 121 to 129 may be shared by a plurality of processing devices.

The present invention is industrially applicable to a diagnosis apparatus.

It should be understood that the invention is not limited to the above-described embodiment, but may be modified into various forms on the basis of the spirit of the invention. Additionally, the modifications are included in the scope of the invention.

What is claimed is:

1. A diagnosis apparatus comprising:
   a sensor that detects diagnosis target information generated by a diagnosis target device;
   a threshold setting unit that sets a threshold for the diagnosis target information; and
   a diagnosis unit that diagnoses the diagnosis target device based on the diagnosis target information detected by the sensor and the threshold,
   wherein the threshold setting unit sets the threshold based on the diagnosis target information in a predetermined period before a diagnosis time point, and
   the diagnosis unit performs diagnosis based on a current time point threshold set at the diagnosis time point and at least one past threshold set in the past.

2. The diagnosis apparatus according to claim 1,
   wherein the diagnosis target information includes a feature amount obtained from a processing result obtained by performing predetermined numerical processing on a detected value of the sensor.

3. The diagnosis apparatus according to claim 1,
   wherein the diagnosis unit diagnoses that there is an abnormality in a case where a ratio of abnormalities in a diagnosis result of each of the current time point threshold and the past threshold is a predetermined value or more.

4. The diagnosis apparatus according to claim 1,
   wherein the diagnosis target information includes a plurality of kinds of feature amounts obtained from processing results obtained by performing a plurality of kinds of predetermined numerical processing on a detected value of the sensor, and
   the diagnosis unit individually obtains a diagnosis result of each of the current time point threshold and the past threshold for the plurality of kinds of feature amounts, and diagnoses that there is an abnormality in a case where a ratio of abnormalities in the diagnosis results is a predetermined value or more.

5. The diagnosis apparatus according to claim 3,
   wherein the diagnosis unit weights some or all of the diagnosis results of each of the current time point threshold and the past threshold, and diagnoses that there is an abnormality in a case where the ratio of abnormalities is a predetermined value or more.

6. The diagnosis apparatus according to claim 1, further comprising:
   a display unit that displays a transition of the diagnosis target information in a predetermined period and each of the current time point threshold and the past threshold set in the predetermined period.

7. The diagnosis apparatus according to claim 6,
   wherein, in the transition of the diagnosis target information in the predetermined period displayed on the display unit, a time point when it is diagnosed that there is an abnormality is marked.

8. The diagnosis apparatus according to claim 6,
   wherein the display unit displays information related to diagnosis at a specific time point.

9. The diagnosis apparatus according to claim 1, further comprising:
   a display unit that displays a comparison result for each of the current time point threshold and the past threshold used for diagnosis.

* * * * *